March 5, 1963   J. H. SAXTON   3,080,485
STELLAR ORIENTATION MONITORING SYSTEM
Filed June 22, 1960   4 Sheets-Sheet 1
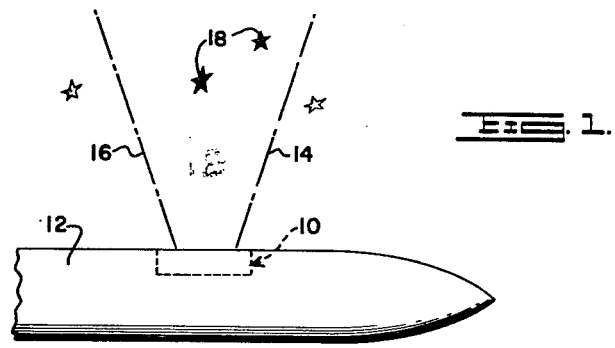
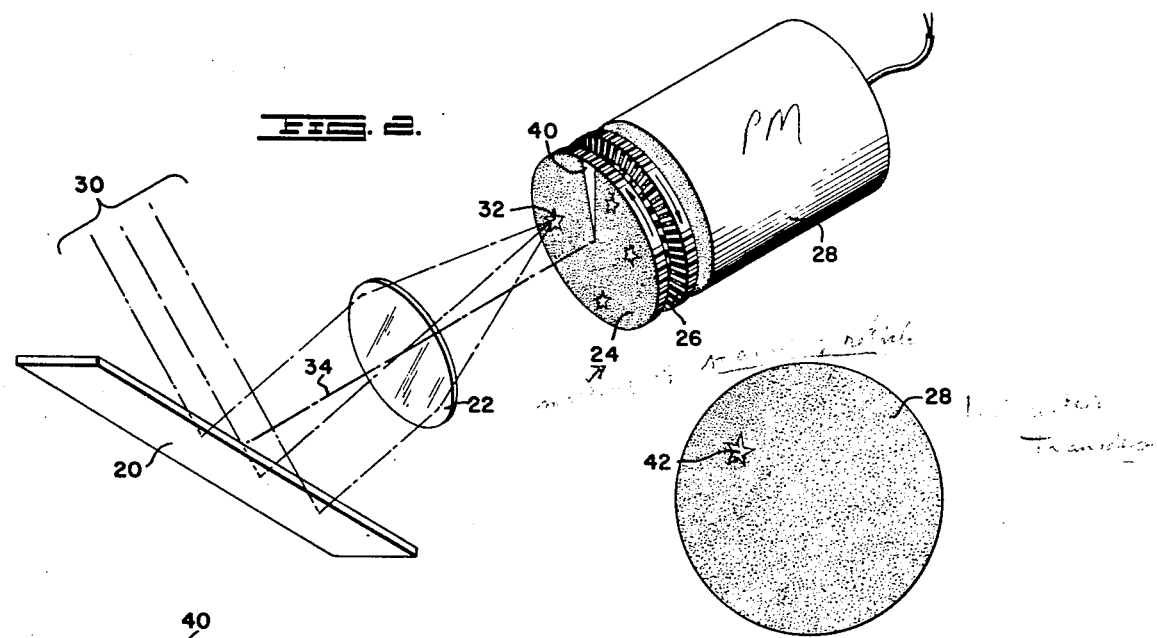
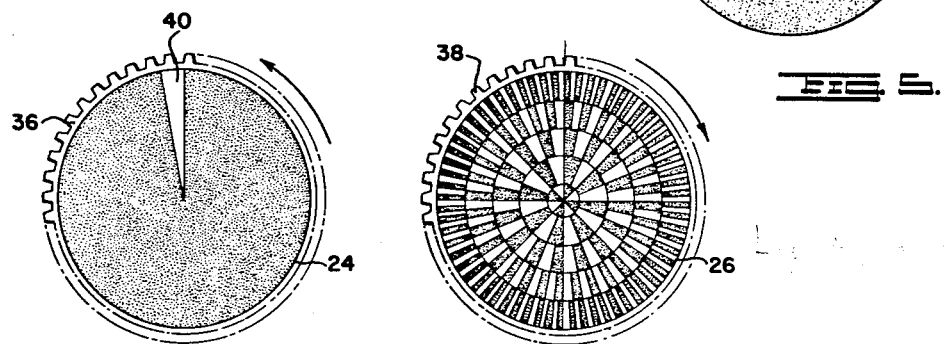
INVENTOR
JAMES H. SAXTON
BY *Harmon & Kurz*
ATTORNEY March 5, 1963 J. H. SAXTON 3,080,485
STELLAR ORIENTATION MONITORING SYSTEM
Filed June 22, 1960 4 Sheets-Sheet 2

INVENTOR
JAMES H. SAXTON
BY Harmon & Kay
ATTORNEY

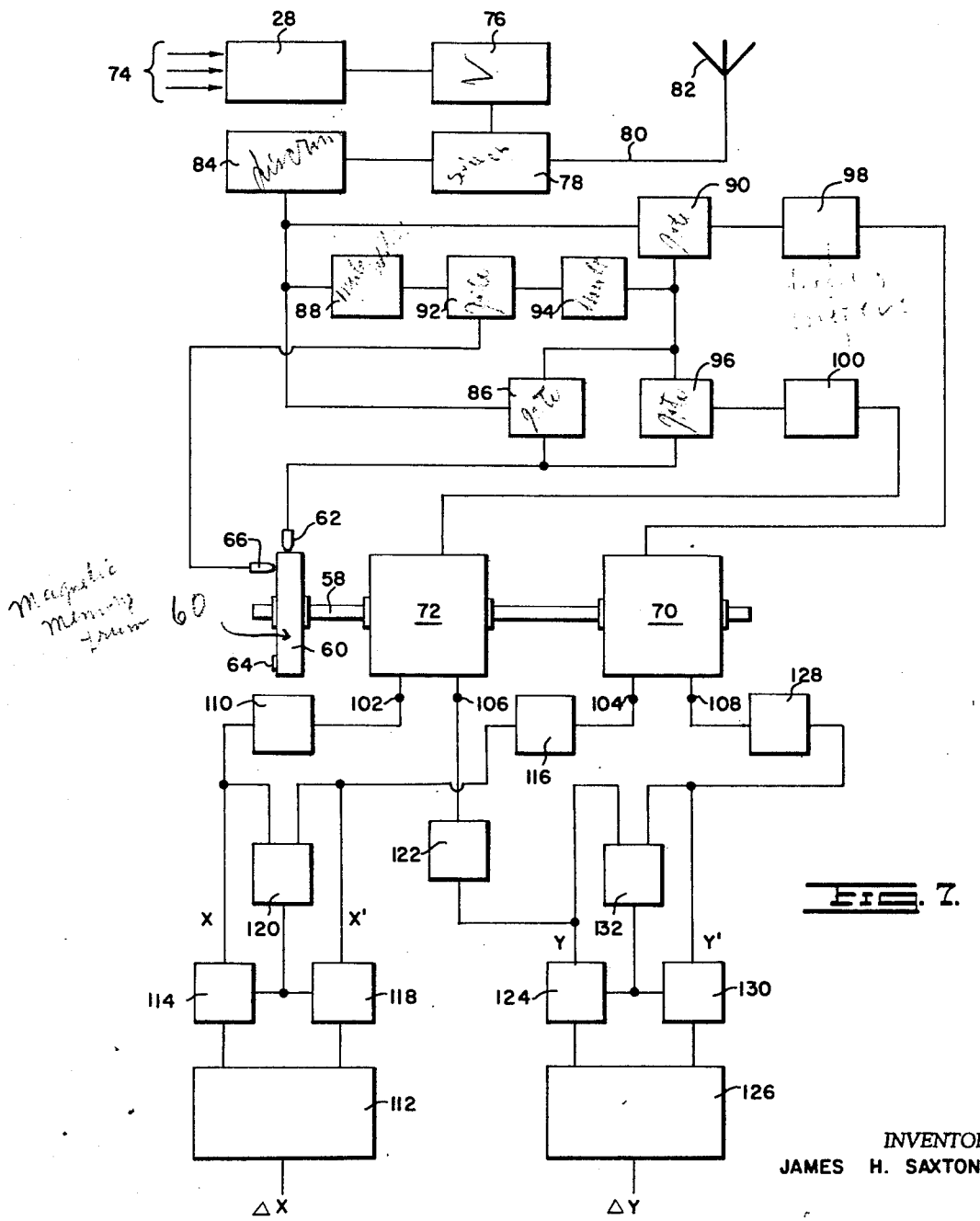

March 5, 1963 J. H. SAXTON 3,080,485
STELLAR ORIENTATION MONITORING SYSTEM
Filed June 22, 1960 4 Sheets—Sheet 4

INVENTOR
JAMES H. SAXTON

BY Harmon + Kurz
ATTORNEY

United States Patent Office 3,080,485
Patented Mar. 5, 1963

3,080,485
STELLAR ORIENTATION MONITORING SYSTEM
James H. Saxton, State College, Pa., assignor to HRB-Singer Incorporated, State College, Pa., a corporation of Delaware
Filed June 22, 1960, Ser. No. 37,887
9 Claims. (Cl. 250—203)

This invention pertains generally to stellar orientation systems, and more particularly to systems of the type adapted to monitor the relative orientation of a reference frame with respect to a stellar field of view to provide an indication of any change in such relative orientation.

In the art of stellar guidance systems, it is usually necessary to maintain a desired orientation of a vehicle with respect to a given stellar field of view. The prior art affords several examples of stellar guidance systems which perform this function; however, each of the systems of the prior art is subject to one or more disadvantages which limit their acceptability. In some instances, the apparatus of the prior art is relatively bulky and cumbersome, while in other instances the prior art systems have proven expensive both to fabricate and to maintain.

It is a primary object of the present invention to provide a stellar orientation monitoring system which avoids the disadvantages of the systems of the prior art.

In accordance with the present invention, the above and other objects are achieved by means of an apparatus for sequentially scanning adjacent segments or portions of a stellar field of view, with means for storing information indicative of the light pattern of such field of view, and means for comparing such stored information in time-coincidence with one or more subsequent scans of such field of view. Any change in the light pattern of the scanned field of view results in an output or error signal indicative of the degree and direction of change of the orientation of the vehicle carrying the monitoring apparatus with respect to the stellar field of view.

With the above considerations and objects in mind, the invention itself will now be described in connection with the preferred embodiment thereof given by way of example and not of limitation, and with reference to the accompanying drawings, in which:

FIG. 1 is a plan view of a representative vehicle carrying the apparatus of the present invention, shown in relationship with a stellar field of view.

FIG. 2 is a perspective view of the optical system of the present invention.

FIG. 3 is a detailed view, in front elevation, of the masking reticle of FIG. 2.

FIG. 4 is a detailed view, in front elevation, of the light-chopping reticle of FIG. 2.

FIG. 6 is a diagrammatic representation of an exemplary form of the mechanical structure of the present invention.

FIG. 7 is a schematic diagram, in block form, of the preferred form of the electrical circuitry of the invention.

Figure 5:
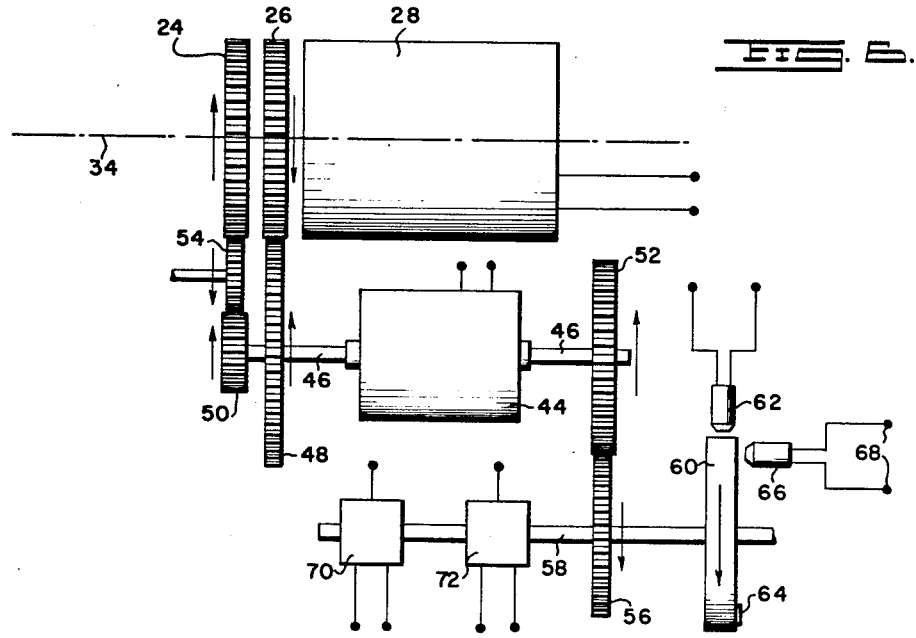
FIG. 5 is a detailed view, in front elevation, of the face of the photoelectric transducer of FIG. 2.

Referring now particularly to FIG. 1, the stellar orientation monitoring apparatus of the present invention is indicated generally at 10, being carried by a rocket 12 or some other suitable vehicle, and having an optical field of view defined by dot-dash lines 14 and 16, such field of view including stars 18. Once the vehicle 12 is positioned in a desired orientation with respect to the stars 18, the monitoring system 10 will store information with respect to the light pattern of such stars with respect to the vehicle 12, and then continuously monitor the field of view to detect any change in such light pattern, as will be further described herein.

The optical system of the apparatus of the present invention is shown in FIG. 2 and includes a folding mirror 20, a converging lens 22, a masking or scanning reticle 24, a light-chopping reticle 26, and a photoelectric transducer 28, the latter preferably being a photomultiplier tube. With the arrangement of these elements as shown in FIG. 2, light from a distant star, represented by parallel light rays 30, are reflected in parallel relationship, and then passed through the converging lens 22 and brought to a focus on the near face of scanning reticle 24; the image of the star providing light rays 30 is indicated at 32 on the face of reticle 24. The optical center line of lens 22 is indicated at 34, such center line being perpendicular to the face of reticle 24 and intersecting such face at its center. It will be understood that the use of the folding mirror 20 is not necessary where the optical axis 34 is in substantial alignment with the received light, the folding mirror 20 being employed merely as a matter of convenience where it is desired to mount the lens 22 in a position in which its optical axis does not substantially coincide with the central portion of the field of view.

As indicated by the arrows on reticles 24 and 26, these two reticles are mounted for relative rotation, preferably in opposite directions, about the optical axis 34. The means for providing such rotation will be described later in connection with the description of FIG. 6. As may be seen in FIGS. 3 and 4, the reticles 24 and 26 are provided with respective gear teeth 36 and 38. Reticle 24 is opaque throughout its face except at a sector 40 of suitable size and shape. Thus, as reticle 24 is rotated about the optical axis 34, the reticle 26 and the light-sensitive face of photomultiplier tube 28 are shielded from any light passing through lens 22 except at the position of transparent sector 40 of reticle 24.

As may be seen in FIG. 4, the light-chopping reticle 26 includes a plurality of concentric circular paths of alternate transparent and opaque segments, with the number of alternately opaque and transparent segments in each of the rings of circular paths being greater for greater radial displacement of such paths. That is to say, the closer the circular path in question is to periphery of the reticle 26, the greater the number of alternate transparent and opaque portions therein. Thus, a narrow beam of light passing through reticle 26 will be chopped at a frequency dependent upon the radial displacement of such beam of light from the central portion of reticle 26 (such portion coinciding with the optical axis 34 of FIG. 2).

In the operation of the optical apparatus shown in FIG. 2 and taken in consideration with the showings of FIGS. 3, 4 and 5, light from a distant star is received as a bundle of parallel rays 30, such rays being reflected by folding mirror 20 in a parallel relationship to the converging or focusing lens 22. Depending upon the angle of incidence of the bundle of rays 30 with respect to the optical axis 34 of the system of FIG. 2, the lens 22 will focus an image of such distant star at some point 32 on the face of scanning reticle 24. If the star in question were aligned with the optical axis 34 (and taking into consideration the reflection provided by folding mirror 20), the image of the star would appear on the face of reticle 24 at the intersection with the optical axis 34; where the star is displaced from the optical axis, and the image is correspondingly displaced from the axis on the face of reticle 24.

As the transparent sector 40 of scanning reticle 24 passes through the position of image 32, a short impulse of light will be passed through sector 40 and onto the face of reticle 26. This impulse of light will be transmitted through reticle 26 and be chopped thereby at a frequency corresponding to the radial displacement of the image 32 from the center line 34 of the optical system. Thus, the light image 32 will appear briefly on the photosensitive face of photomultiplier 28 as a flickering or chopped light image 42, with the frequency of such chopped light being indicative of the radial displacement of the image 32, and with the azimuth of such image (relative to some fiducial position of the scanning sector 40) being indicated by the phasing of the light impulse passed to photomultiplier 28 relative to the period of scan of reticle 24.

Referring now to FIG. 6 of the drawings, the scanning or masking reticle 24, chopping reticle 26 and the photomultiplier tube 28 are shown in alignment along the optical axis 34. An electrical motor 44 or the like has a rotary output shaft 46, one end of which carries a large spur gear 48 and a smaller spur gear 50, with a third spur gear 52 being carried by the opposite end of shaft 46. Gear 48 meshes directly with the gear teeth on the periphery of light-chopping reticle 26, while gear 50 drives scanning reticle 24 by means of an intermediate gear 54, the latter being mounted by suitable means for idler rotation between gear 50 and scanning reticle 24. In this manner, a convenient means is provided for effecting a desirably large relative rotational velocity between reticles 24 and 26.

Gear 52 meshes with a gear 56 carried by a shaft 58, the latter being mounted by means not shown for rotation about its axis. Shaft 58 carries a magnetic memory drum 60 or the like for rotation about the axis of shaft 58, such memory drum having a read-record head 62 for recording magnetic impulses around the periphery of drum 60 during a recording scan, as well as for reading such impulses during one or more subsequent scans. Also, magnetic memory drum 60 carries a member 64 of magnetic material, with a synchronization pick-off or reading head 66 being in substantial alignment with the circular path through which magnetic member 64 travels. Thus, each time the magnetic memory drum 60 goes through a cycle of rotational movement, the magnetic member 64 passes in the vicinity of the synchronization pick-off 66 to supply an electrical synchronizing output signal at terminal 68.

Since magnetic memory drum 60 is secured to shaft 58, with the latter being driven in synchronism with shaft 46 and reticles 24 and 26, the synchronizing signal supplied at terminal 68 are indicative of the phasing of all of the rotary members. Shaft 58 also carries the rotary elements of a pair of inductive resolvers, such resolvers being shown at 70 and 72 in FIG. 6.

In the operation of the mechanical apparatus of FIG. 6, energization of motor 44 causes rotation of shaft 46 in the direction indicated by the arrows on gears 48, 50 and 52. Upon such rotation of these gears, the reticles 24 and 26 are rotated in opposite directions to chop and sequentially scan the light of the stellar field of view, thus presenting light impulses of appropriate frequency and time occurrence to the photosensitive face of photomultiplier tube 28, as described above. Since gears 52 and 56 are driven in synchronism with the rotation of reticles 24 and 26, the rotational movement of memory drum 60 and of the rotary elements of inductive resolvers 70 and 72 is also in synchronism with the movement of reticles 24 and 26.

FIG. 7 shows in block form the entire electrical system of the invention, with light from reticles 24 and 26 being applied to the light-sensitive face of photomultiplier tube 28 as indicated by the arrows 74. The electrical output of photomultiplier tube 28 is applied to an amplifier 76, if desired, to amplify the voltage of such output signals. The output of amplifier 76 is applied to a switch 78, with the latter being controlled by signals applied thereto from line 80 from an antenna 82 or the like which is adapted to receive remote control signals, as from a ground or other remote station. The normal condition of switch 78 is such as to prevent the passage of signals from amplifier 76 to the remaining portion of the circuitry of FIG. 7; only upon the reception of a signal on line 80 for the initiation of the operation of the circuitry is the switch 78 operated to close the circuit from the output of amplifier 76 to the input of amplitude discriminator 84. The purpose of the discriminator 84 is to prevent the passage of electrical signals representative of stars and other like sources of a magnitude below a desired and preset level, in order to provide operation of this circuitry only in response to strong, reliable signals.

The output of amplitude discriminator 84 is applied to the input of a gate 86, as well as to the input of a monostable multivibrator 88 and the input of a second gate 90. The output of gate 86 is applied to the recording head 62 for recording the output of amplitude discriminator 84 on magnetic memory drum 60; the normal condition of gate 86 is such as to pass these output signals of amplitude discriminator 84 to the recording head 62.

Monostable multivibrator 88 supplies an output pulse of time duration slightly less than the period of rotation of magnetic memory drum 60 (and thus slightly less than the period of rotation of all of the rotary members of FIG. 6), such output pulse being applied to a gate 92, the input to which is derived from synchronization pick-off head 66, and the output of which (when the gate is open) is applied to the input of a second monostable multivibrator 94. The output signal from multivibrator 94 is applied to the control circuits of three gates, viz., gate 86, gate 90 and a third gate 96, which the output pulse from monostable multivibrator 94 also being of a period just slightly less than the period of rotation of magnetic memory drum 60. The sense or polarity in which the control signal from multivibrator 94 is applied to gate 86 is opposite to that of the control signal supplied to gates 90 and 96, so that when the output pulse from multivibrator 94 is applied to the three control circuits, gates 90 and 96 are opened to pass signals therethrough, whereas gate 86 is closed. This differential operation may be achieved by means of a reversed input circuit in gate 86 (as compared to the input circuits of gates 90 and 96), or by the insertion of a phase reversing stage between the output of multivibrator 94 and the control input to gate 86. Alternatively, the output of multivibrator 94 as applied to gate 86 may be taken from a point in the circuitry of the multivibrator other than that from which the output is taken for gates 90 and 96.

The outputs of gates 90 and 96 are applied to the inputs of respective frequency meters or counters 98 and 100, the function of each of which is to supply an output signal the magnitude of which is indicative of the frequency of the input signal. The output of counter 98 is applied to the input circuit of inductive resolver 70, and the output of counter 100 is applied to the input circuit of inductive resolver 72. As previously described, the rotary elements of resolvers 70 and 72 are rotated in synchronism with the magnetic memory drum 60 and the other rotary elements of FIG. 6, and the respective outputs of each of the resolvers 70 and 72 are thus indicative of the rotational positioning of such rotary elements, with the resolver outputs providing the desired position information in rectangular coordinates, as opposed to polar coordinates, as is common in the art of inductive resolvers.

In describing the remaining portion of the circuitry of FIG. 7, it will be convenient to make reference to the X and Y coordinates presented by the nature of the outputs of the two inductive resolvers 70 and 72. Thus, if the information at output terminal 102 of resolver 72 is indicative of the X coordinate, and the information at output terminal 104 of resolver 70 is indicative of a second X coordinate, and labeled X', then the information at output terminal 106 of resolver 72 provides Y information, and the output at terminal 108 of resolver 70 is Y' information. The significance of the X, X', Y and Y' information signals will be better understood in connection with the description of the operation of the circuitry of FIG. 7; it is sufficient here to note that the remaining circuitry to be described in this figure is divided into two channels, viz., one of which has the X and X' signals applied thereto to provide an output indicative of change in orientation as expressed in an X component, while the other channel provides an analogous output indicating change in orientation as expressed in a Y component.

Output terminal 102 of resolver 72 is connected to the input of a pulse stretcher 110 or the like, the output of which is applied to one of the inputs of a differential amplifier 112 in the absence of a signal at the other input, the gates 114 and 118 are controlled by means of a coincidence circuit 120, the inputs to which are respectively connected to the output of pulse stretchers 110 and 116, with the output of coincidence circuit 120 being applied to the control circuits of gates 114 and 118.

The circuitry connected to terminals 106 and 108 of resolver 72 and 70, respectively, is analogous to that just described in connection with terminals 102 and 104. Thus, the output of resolver 72 at terminal 106 is applied through a pulse stretcher 122 and a gate 124 to one of the inputs of a differential amplifier 126. Similarly, the output of resolver 70 at terminal 108 is supplied to the other input terminal of differential amplifier 126 through a pulse stretcher 128 and a gate 130. A coincidence circuit 132 has its respective inputs connected to the outputs of pulse stretchers 122 and 128, with the output of coincidence circuit 132 being applied to the control circuits of gates 124 and 130. The outputs of the X differential amplifier 112 and Y differential amplifier 126 may be applied to any suitable load device, such as means for automatically adjusting the orientation of the vehicle carrying the apparatus of the invention, or, alternatively, may be connected to a suitable indicator for providing an indication of the change in orientation of such vehicle.

In describing the operation of the circuitry of FIG. 7, it will be assumed that the rotary elements shown in FIG. 6 are rotating at full speed before the first signal is passed by switch 78; in this connection, some means not shown may be included to initiate rotation of the rotary elements upon the reception of a signal on line 80, with an appropriate delay being introduced before the operation of switch 78 to connect the output of amplifier 76 to the ampli- tude discriminator 84. Assuming the apparatus of the present invention to be carried aboard a missile, a rocket or the like, and assuming that it is desired to place the vehicle in a suitable position in flight before initiating operation of the orientation monitoring system of this invention, the vehicle will be started on its flight under a different control system or in a ballistic manner so as to place the vehicle in a desired orientation before the operation of the circuitry of this invention. Prior to the initiation of such operation, the optical system of FIG. 2 will be receiving light from stars within the stellar field of view, such light being focused and chopped as previously described to provide an electrical output from photomultiplier tube 28 to amplifier 76. Until the switch 78 is closed, no further operation of the circuitry of FIG. 7 obtains.

When it is desired to initiate the operation of the circuitry of FIG. 7, the switch 78 may be closed by means of a signal applied to line 80, either by reception of a radiated signal at the antenna 82 for application of a remotely generated control signal to the switch 78, or, alternatively, line 80 may be connected to the output of a programmed voltage generator, the latter being preset to supply a switch-energizing impulse on line 80 at a preset time after the initiation of the flight of the vehicle.

Once switch 78 is energized to the closed position, the output of amplifier 76 is applied to the input of amplitude discriminator 84. This amplitude discriminator is adjusted to pass signals of a preselected magnitude or greater, and to reject signals of lesser amplitude. In this manner, noise signals and the like, as well as signals from stars of rather faint brilliance, are prevented from being passed into the remaining portion of the circuitry of FIG. 7; only signals representative of stars of usable brilliance are passed by the discriminator 84. Since gate 86 is normally in the gate-open condition, any signals passed through amplitude discriminator 84 are also passed through gate 86 to recording head 62, such signals thus being recorded sequentially on the periphery of the scanning or rotating memory drum 60. Since gates 90 and 96 are normally in the gate-closed position, the signals applied to gate 90 from amplitude discriminator 84 are not passed to frequency meter 98, and the signals applied to recording head 62 by gate 86 are not passed to frequency meter 100.

Upon the passage of the first signal of sufficient amplitude by discriminator 84, the monostable multivibrator 88 is energized to produce an output pulse of rectangular form, the period of which is almost as great as the period of rotation of the scanning or rotating elements of FIG. 6. This rectangular output pulse of multivibrator 88 is effective in opening the gate 92 to pass signals from synchronization take-off 66 to the input of the second monostable multivibrator 94. As will be understood, the reason for this length of the output pulse from multivibrator 88 is to hold gate 92 open for a time sufficient to include the passage of magnetic member 64 on drum 60 under the pick-off head 66, with the resultant signal output from head 66 being passed through the open gate to the input of multivibrator 94. If the period of the output pulse from the multivibrator 88 were substantially shorter than the period of rotation of memory drum 60, then the period during which gate 92 is held open by such output pulse might not include the time at which magnetic member 64 passes under head 66, and the output signal from head 66 would therefore not be passed to multivibrator 94 for the control of gates 90 and 96. As is evident, on the other hand, the output pulse of monostable multivibrator 88 must be somewhat less than the period of rotation of magnetic memory drum 60 and the other rotary elements of FIG. 6, in order to allow for the apparent drift of the stellar field of view between adjacent scans of the optical system, since it is conceivable that the vehicle may move a sufficient distance along its prescribed course, or in some other non-predicted manner, to present as an input to multivibrator 88 a signal representative of the first star of sufficient magnitude but as seen on the second scan of the rotary optical reticles at a time which is somewhat less than the period of rotation of magnetic memory drum 60 subsequent to the time of first presenting such a signal to the input of multivibrator 88. That is to say, motion of the vehicle relative to the stellar field of view between adjacent scans of the optical system can be such as to present a signal representative of the second scan of a star of sufficient magnitude at the input of multivibrator 88 at a time which is less than a full rotary period subsequent to the first presentation of such signal at the input of multivibrator 88. Thus, if the period of the output rectangular pulse of multivibrator 88 were equal to or greater than the period of rotation of memory drum 60, it is entirely possible that the second input pulse applied to the multivibrator 88 would be ineffective, since such multivibrator would still be in its energized or quasistable state. If this were allowed to happen, then the multi-vibrator 88 would return to its stable state shortly after the application of the ineffective second input pulse thereto, and the next synchronizing pulse from pick-off 66 would not be passed by gate 92.

Once the output pulse from multivibrator 88 has opened gate 92 and permitted a synchronizing pulse from pick-off 66 to pass through gate 92 to be applied as an input signal to multivibrator 94, an output pulse of rectangular form is supplied from monostable multivibrator 94, such output pulse being of a period substantially equal to that of multivibrator 88. This output multivibrator 94 is applied to the control circuits of gates 90 and 96 to energize such gates to the gate-open condition, while being applied to gate 86 to close the latter. Upon the closing of gate 86, the input signals supplied by the output of amplitude discriminator 84 are no longer applied to the recording head 62, but are now fed through gate 90 to the frequency meter 98. Further, since gate 96 is now open, the head 62 now functions as a reading head, providing signals corresponding to the previously recorded information, such signals being passed through gate 96 to frequency meter 100. The frequency meters 98 and 100 are thus energized simultaneously by the respective signals, frequency meter 100 being energized by signals representative of the information recorded on a previous scan of the optical reticles, and frequency meter 98 being energized by signals presently being received through such optical elements. As a result of the synchronization of the operation of gates 90 and 96 with the passage of magnetic member 64 under pick-off 66 (the timing of the passage of member 64 under pick-off 66 corresponding to the time of initiation of a scan by reticle 24), the signals of the recorded scan are presented to frequency meter 100 in scan-synchronism with the signals presented to frequency meter 98.

The two counters or frequency meters 98 and 100 each provide an output signal the amplitude of which corresponds to the frequency of the input signal applied thereto; thus, the amplitude of the signal applied to inductive resolver 72 is indicative of the radial displacement of the image of a given star the electrical signal corresponding to which was recorded on a previous scan of memory drum 60, while the amplitude of the electrical signal applied to the input resolver 70 is indicative of the radial displacement of the image of such star as seen in the scan now taking place. A comparison of these two voltages provides an indication of the change in radial displacement from optical center line 34 of the image of a given star as between the recorded scan and the subsequent or present scan; such change in the radial displacement of the star image indicating, in turn, a corresponding change in the orientation of the vehicle with respect to such star in the stellar field of view.

The relative phasing between the time of occurrence of the input signals at resolvers 70 and 72 and the position of the rotary elements therein in their scan provides an indication of the angular or azimuthal position of the image of the star in question on the face of reticle 24. Thus, information is provided to the resolvers 70 and 72 which affords both angular and radial measurement of the position of an image of a given star on reticle 24, and, correspondingly, on the face of photomultiplier tube 28. The purpose of the resolvers 70 and 72 is to translate such polar coordinates into rectangular coordinates for further comparison in order to derive rectangular coordinate information indicative of the change of orientation of the vehicle carrying the apparatus of the invention, such change being measured between a first or recorded scan of the optical elements and one or more subsequent scans thereof.

Since the corresponding signals applied as inputs to resolvers 70 and 72 will not, in all likelihood, be so applied in time coincidence, it will be necessary to provide some means for storing or otherwise preserving a signal at each of the output terminals 102, 104, 106 and 108, so as to be able to perform a comparison between the respective pairs of signals at such terminals. That is to say, since it is desired to effect a comparison between the signals at terminal 102 and the signals at terminal 104, and since the signals at such terminals will often not be present at exactly the same time, means must be provided for preserving the earlier of the two signals for a time sufficient to permit the later signal to occur, thus permitting a comparison of the amplitudes of the two signals in the differential amplifier 112. Thus, the signals providing X information at terminal 102 are passed through a pulse stretcher 110 which provides as an output a signal of the same amplitude as the input signal but of a greater duration. Similarly, the X' signals at terminal 104 are stretched in pulse stretcher 116 before being applied to differential amplifier 112 through gate 118.

Since it is the nature of a differential amplifier such as that indicated at 112 in FIG. 7 to provide zero output when the two inputs are equal, and providing an increasingly larger output for increasing difference between the two input signals, it is essential that the X and X' signals be applied to the inputs of amplifier 112 in synchronism; otherwise, if only one of the signals were to be applied at a given time, a relatively large, and fallacious, error or output signal would be provided at the output of amplifier 112. Thus, the gates 114 and 118 are controlled by the coincidence circuits 120, the latter opening the two gates only upon the simultaneous reception of signals from pulse stretchers 110 and 116. When signals are present at the output of both of these pulse stretchers, the coincidence circuit 120 provides an output signal which is applied to the control circuits of the gates 114 and 118 to energize such gates to the gate-open condition, thus passing the X and X' signals to the inputs of the differential amplifier 112. Where these X and X' signals are equal, there is zero output from amplifier 112, indicating zero change in orientation of the vehicle with respect to the stellar field of view as between the initial or recorded scan and the second or subsequent scan.

The operation of the circuits leading from terminals 106 and 108 to the input terminals of differential amplifier 126 is analogous to that just described. Thus, the Y signals are stretched in pulse stretcher 122, the Y' signals are stretched in pulse 128, and the two stretched signals are applied to the respective input terminals of amplifier 126 through gates 124 and 130 under the control of the coincidence circuit 132 to provide an output from amplifier 126 indicative of the Y component of change of orientation of the vehicle relative to the stellar field of view.

Figure 8:
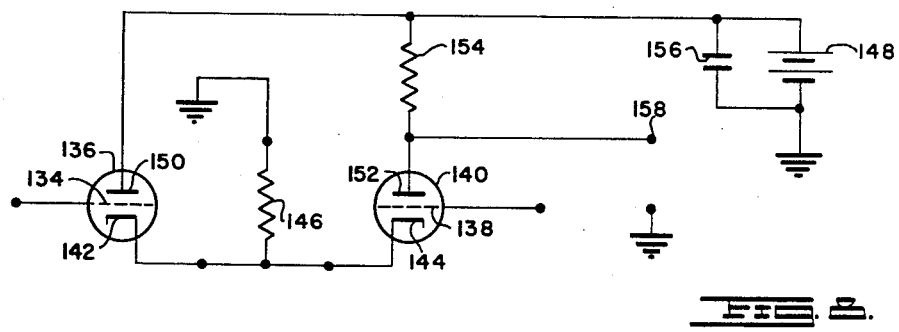
FIG. 8 is a schematic diagram of an exemplary form of each of the differential amplifiers of FIG. 7.

FIG. 8 shows one exemplary form of the detailed circuitry of the differential amplifiers 112 and 126 of FIG. 7. The output from one of the gates 124 and 130, for example, is applied to grid 134 of tube 136, while the other of these gate outputs is applied to grid 138 of tube 140. The cathodes 142 and 144 of tubes 136 and 140 are connected together and to a cathode resistor 146, the remote end of which is connected to ground, or, alternatively, through a bias source to ground. A plate supply source 148 has its negative terminal connected to ground, with its positive terminal being connected to plates 150 and 152, the connection to the latter being through a load resistor 154. As is customary, a by-pass condenser 156 is connected in shunt with the source 148. The differential output of this amplifier is taken at terminal 158 and ground, terminal 158 being connected directly to plate 152 of tube 140.

In the operation of the differential amplifier of FIG. 8, it will be noted that the tube 136 acts as a cathode follower, with the potential of the cathode following that of the grid; as a result, the signal applied to grid 134 from, say, the output of gate 124 is also applied to the cathode 144 of tube 140. The output of gate 130 is thus applied to grid 138 of tube 140, and the effective grid-to-cathode voltage in tube 140 is the difference between the voltages applied to grid 138 and to cathode 144. This effective voltage is therefore the difference between the two outputs passed by the gates 124 and 130. Thus, the space current flowing in tube 140 corresponds to the difference between these two input voltages, and the voltage drop across resistor 154 follows the variations in the plate current. Accordingly, the potential at plate 152 and thus at output terminal 158, is a function of the difference between the two input voltages.

Figure 9:
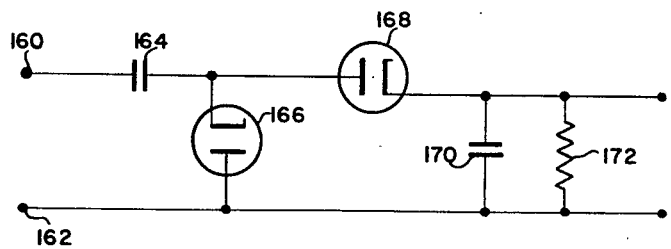
FIG. 9 is a schematic diagram of the circuitry of each of the frequency meters of FIG. 7.

FIG. 9 shows an exemplary form of the circuitry of the frequency meters 98 and 100 of FIG. 7. In FIG. 9, the input circuitry is adapted for negative-going input pulses; as is evident, if the output pulses from gates 90 and 96 are positive-going, the polarity of the elements in the circuitry of FIG. 9 will be reversed. The negative input pulses are applied across input terminals 160 and 162, with terminal 160 being connected to one plate of condenser 164. The other plate of condenser 164 is connected to the cathode of a diode 166, the anode of which is connected to terminal 162. The cathode of diode 166 is also connected to the anode of a second diode 168, the cathode of which is connected to the anode of tube 166 through a second condenser 170. A load resistor 172 is connected across condenser 170, and the output voltage of the frequency meter or counter is taken across resistor 172.

In the operation of the counter circuit of FIG. 9, the negative-going pulses are applied between terminals 160 and 162, each succeeding negative input pulse placing a further charge on condenser 164, with the left-hand plate of condenser 164 gaining a negative charge and the right-hand plate gaining a positive charge. The charging circuit for condenser 164 is through diode 166, which conducts when the pulse applied to terminal 160 is negative with respect to the voltage at terminal 162. When condenser 164 is charging, the polarity is such as to cause diode 168 to be cut-off. However, at the termination of each input pulse, the positive charge that has been accumulated at the right-hand plate of condenser 164 causes diode 168 to conduct through the parallel combination of condenser 170 and resistor 172; during this discharge time, diode 166 is non-conducting. As is understood by those skilled in the art, the average D.-C. voltage appearing across resistor 172 is proportional to the product of the applied voltage at terminals 160 and 162, the capacity of condenser 164, the resistance of resistor 172 and the frequency of the applied input signals. Thus, the voltage appearing across resistor 172 is proportional to and affords a measure of the frequency of the applied input pulses.

Figure 10:
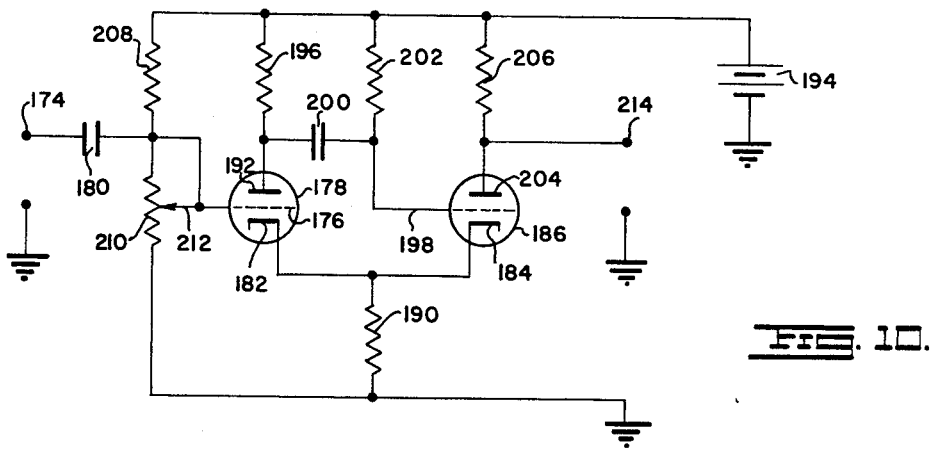
FIG. 10 is a schematic diagram of an exemplary form of each of the monostable multivibrators of FIG. 7.

FIG. 10 shows one exemplary form of the circuitry of the cathode-coupled monostable multivibrators 88 and 94 of FIG. 7. In FIG. 10, the input is applied between terminal 174 and ground, such terminal being connected to grid 176 of tube 178 through a condenser 180. The cathode 182 of tube 178 is connected to the cathode 184 of tube 186 and to ground through a resistor 190. The anode 192 of tube 178 is connected to the positive terminal of a plate supply source 194 through a resistor 196, as well as to grid 198 of tube 186 through condenser 200. Grid 198 is connected to the positive terminal of source 194 through a resistor 202, and anode 204 of tube 186 is connected to the positive terminal of source 194 through a plate load resistor 206. A voltage dividing network comprising a resistor 208 and a potentiometer 210 is connected between the positive terminal of source 194 and ground; the tap 212 on potentiometer 210 is connected to grid 176 of tube 178. An output terminal 214 is connected to plate 204 of tube 186, the output being taken between terminal 214 and ground.

In the operation of the circuitry of FIG. 10, in the initial condition tube 178 is non-conducting and tube 186 is conducting. In order to achieve these initial conditions, the bias potential appearing between ground and the tap 212 on potentiometer 210 must be sufficiently small so as to not overcome the negative bias for tube 178 generated by the flow of cathode current of tube 186 through resistor 190. That is to say, the voltage drop across resistor 190 as a result of the cathode current of tube 186 must be greater than the voltage at tap 212 by at least the cut-off voltage of tube 178. As shown in FIG. 10, the circuit is designed for the reception of a positive triggering pulse at terminal 174; as is evident, if the circuit should receive negative trigger pulses instead of positive pulses, suitable means may be employed to reverse the phase of the input pulse, such means comprising, for example, an additional amplification stage. Upon the application of a positive pulse at grid 176, the reverse bias on tube 178 is overcome, and tube 178 becomes conducting. As a result, the potential at plate 192 drops sharply, such potential being transferred to grid 198 by means of condenser 200, resulting in tube 186 being cut-off. The multivibrator has now been switched from its stable stage to the quasi-stable state. In this quasi-stable state, the output voltage at terminal 214 (which is the volage at plate 204) rises abruptly and remains at a large positive value until the multivibrator returns to its stable state. This return to the stable state occurs after the exponential rise of the voltage at grid 198 returns such grid to the cut-off point for tube 186. As the potential on grid 198 rises above such cut-off level, tube 186 again becomes conducting, and tube 178 is cut-off. The circuit is now once again in its initial condition, and the output voltage at terminal 214 is again a relatively low voltage.

Figure 11:
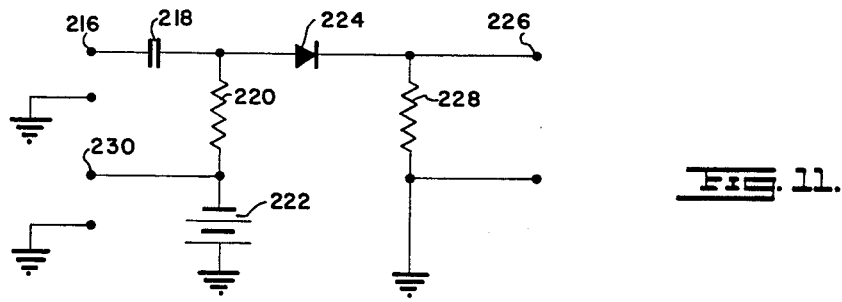
FIG. 11 is a schematic diagram of an exemplary form of each of the gating circuits of FIG. 7.

FIGURE 11 shows an exemplary form of circuitry for the several gate circuits of FIG. 7. Terminal 216 and ground serve as the input to the gate circuit of FIG. 11, with terminal 216 being connected through a condenser 218 and a resistance 220 to the negative terminal of a bias source 222 of suitable electrical potential and the positive terminal of source 222 being connected to ground. The junction between condenser 218 and resistance 220 is connected through a unilaterally conducting device 224 (such as a semiconductive diode or the like) to an output terminal 226, the latter being connected through a resistor 228 to ground, with the gate output being taken across resistor 228 (that is, between terminal 226 and ground).

The polarity of connection for diode 224 is such as to present low resistivity to electron flow through the diode from right to left as seen in FIG. 11; thus, the potential applied by source 222 to diode 224 is a reverse or back bias. The gate circuit as thus shown is adapted to receive positive pulses at the signal input terminal 216 for transmission to signal output terminal 226 when the gate is opened by the application of a positive gating pulse between gate input terminal 230 and ground. The magnitude of the potential of source 222 is greater than the largest signal input pulse that is to be received at terminal 216 in order to maintain the diode 224 in a reverse-biased condition for any signal input level in the absence of a gating input pulse at terminal 230. The amplitude of the gating input pulse is equal to the potential of source 222, so that during the time that a gating pulse is applied to the circuit, the reverse-bias potential of source 222 is exactly cancelled, thus permitting transmission of a signal input pulse at terminal 216 through to output terminal 226 without an increase or decrease in amplitude thereof.

In the operation of gating circuit of FIG. 11, the diode 224 is maintained in a non-conducting condition by the reverse bias applied by potential source 222. In view of the fact that the potential of source 222 is greater than any of the signal input pulses at terminal 216, the diode 224 is maintained in this non-conducting state irrespective of the amplitude of the signal input pulses so long as no gating pulse is applied at terminal 230. In this non-conducting condition of diode 224, the signal input pulses at terminal 216 are prevented from reaching output terminal 226. When, however, a gating input pulse of positive potential equal to the negative potential of source 222 is applied at terminal 230, the reverse bias on diode 224 is removed, and the positive signal input pulses at terminal 216 thereupon cause conduction of diode 224 through the circuit including resistor 228. The flow of current through resistor 228 produces a voltage thereacross equal to (assuming zero forward resistance of diode 224) the amplitude of the signal input pulse. Thus, the input pulse appears in unmodified form between output terminal 226 and ground. It will be understood by those skilled in the art that the circuit of FIG. 11 may be adapted to pass signal pulses of negative polarity, as by reversing the polarity of source 222 and reversing the connection of diode 224.

As to the polarity of the control signals applied to the gates of FIG. 7, since it is desired to hold gate 86 open with gates 90 and 96 closed, and vice versa, the output from multivibrator 94 for gates 90 and 96 may be taken from the anode of one of the tubes (such as anode 204), while the output applied to gate 86 is taken from anode 192 of the other tube.

Figure 12:
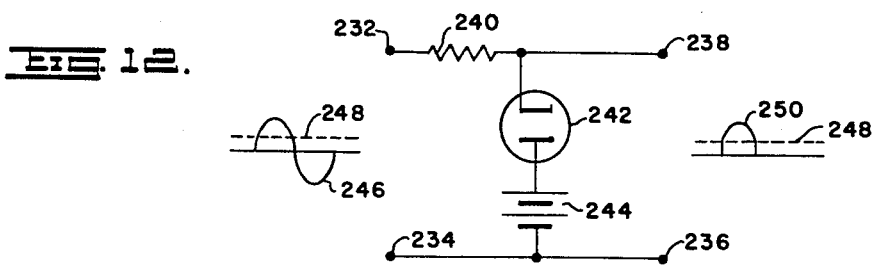
FIG. 12 is a schematic diagram of an exemplary form of the amplitude discriminator of FIG. 7.

Referring now to FIG. 12, there is shown an exemplary circuit for the amplitude discriminator 84 of FIG. 7. In FIG. 12, the input to the discriminator circuit is applied between terminals 232 and 234, the latter being connected to an output terminal 236, with the former being connected to the remaining output terminal 238 through a suitable resistor 240. A diode 242 and a source 244 of bias potential are connected in series relationship between output terminals 236 and 238. The negative terminal of potential source 244 is connected to terminal 236, the anode of diode 242 is connected to the positive terminal of source 244, and the cathode of diode 242 is connected to terminal 238.

In the operation of the amplitude discriminator circuit of FIG. 12, an input signal such as that represented by the sine wave 246 is applied between terminals 232 and 234. Due to the polarity of the source 244, the diode 242 is biased for conduction, and, as a result, the output terminals 236 and 238 are effectively short-circuited (assuming zero forward resistance in diode 242). As long as the output terminals are thus shorted together, no output signal appears therebetween. This condition of zero output obtains until the input signal 246 reaches a positive potential equal to the potential of source 244, such potential being indicated by the dotted line 248. As the input signal 246 proceeds in a positive direction beyond the potential of source 244, the bias on diode 242 becomes a reverse bias, instead of the previously-applied forward bias. Thus, diode 242 becomes non-conducting, and the impedance between output terminals 236 and 238 thus becomes infinite (at least with respect to the path through diode 242). With a high impedance thus appearing between terminals 236 and 238, an output signal 250 (representing a top portion of the input sine wave 246) appears between output terminals 236 and 238. If the resistance of resistor 240 were zero, the amplitude of output signal 250 would equal the amplitude of input signal 246; since it is not essential (at the portion of the circuitry of FIG. 7 at which the amplitude discriminator of FIG. 12 is utilized) to pass a signal from the amplitude discriminator exactly equalling the amplitude of the input, the limiting resistor 240 may be used if desired.

Figure 13:
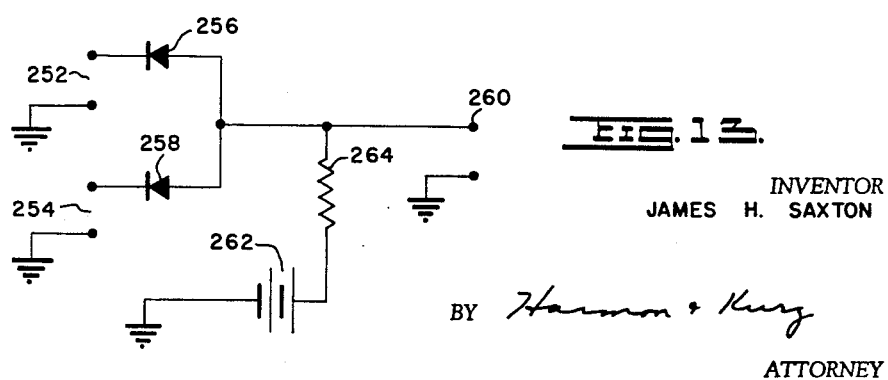
FIG. 13 is a schematic diagram of an exemplary form of each of the coincidence circuits of FIG. 7.

One form of suitable circuitry for the coincidence circuits 120 and 132 of FIG. 7 is shown in FIG. 13. Assuming the circuitry of FIG. 13 to represent the coincidence circuit 120 of FIG. 7, a pair of input terminals 252, which may be connected to the output of pulse stretcher 110 in FIG. 7, are provided as one input to the coincidence circuit, with a second pair of input terminals 250 also being provided, such second pair of terminals being connected to the output of pulse stretcher 116 in FIG. 7. One each of the terminals 252 and 254 are connected to ground, with the remaining terminals being connected together by the series-connected rectifiers 256 and 258. The common junction between these two rectifying elements is connected to an output terminal 260, the other terminal of the output of the circuit of FIG. 13 being connected to ground. The positive terminal of a bias source 262 is connected through a resistor 264 to the output terminal 260, with the negative terminal of source 262 being connected to ground. The sense of the connection of rectifiers 256 and 258 is such as to provide low resistivity to electron flow from left to right through both rectifiers as seen in FIG. 13. With these rectifiers connected in this manner, the potential applied thereto by source 262 is a forward bias, and both diodes 256 and 258 are thus normally conducting.

In the operation of the coincidence circuitry of FIG. 13, the forward bias applied by source 262 to the two diodes maintains conduction through the diodes as just explained, and, assuming the circuits feeding signals to terminals 252 and 254 to be of low impedance, a voltage drop substantially equal to the potential of source 262 appears across resistor 264. As a result, terminal 260 is clamped at or near ground potential, and this condition is maintained as long as either of the diodes 256 and 258 are conducting. The potential of bias source 262 is made substantially equal to the magnitude of the pulse outputs from the pulse stretchers of FIG. 7. Thus, if a positive pulse from one of the pulse stretchers is applied between terminals 252, such pulse being equal in amplitude to the forward bias applied by potential source 262, the diode 256 is rendered non-conducting. Under these conditions, the potential at terminal 260 is still clamped at or near ground potenial.

Assuming now that a positive signal pulse appears at terminals 254 while the positive input is still existent at terminals 252, the diode 258 will similarly be rendered non-conducting. With both diodes 256 and 258 non-conducting, the current through resistor 264 ceases, and the voltage drop thereacross is reduced to zero. The potential at terminal 260 is thus raised to the potential of the positive terminal of source 262, thus providing a positive output pulse of time duration corresponding to the period during which input signals are applied to both terminal pairs 252 and 254. As soon as either of these input signals fails, the corresponding diode will again become conducting, and the voltage at terminal 260 once again assumes a zero or low value.

The invention has been described above in considerable detail, and particularly with reference to its application to a system for monitoring orientation with respect to a field of view providing a visible light pattern, as well as to airborne and analogous vehicles. However, it will be apparent to those skilled in the art that the invention is also applicable to vehicles other than airborne, and to a field of view providing radiant energy of a wave length outside the visible light spectrum. Where, in the language of the appended claims, the term "reference frame" is employed, such terminology is therefore intended to refer to the vehicle, whether airborne or otherwise, or other support frame which carries or includes the stellar orientation monitoring apparatus of the invention, such vehicle or other support frame comprising the reference frame whose orientation is to be monitored.

As is evident, the circuitry and apparatus of the present invention pertain to the monitoring of orientation of a vehicle with respect to changes in roll and yaw, and not in pitch. This assumes that the field of view seen by the optical apparatus is a side view from the vehicle, transverse to the direction of motion. Thus, a change in the roll position between scans of the monitoring system would present an output from the differential amplifier providing Y output (Y corresponding to the vertical rectangular coordinate), and a change in yaw would provide an output from the other differential amplifier, indicating a change in the X orientation information. Both of these indications are unambiguous, and a suitable correction may be made in response to either such output from the differential amplifiers. If, on the other hand, a change in pitch were to be observed by this monitoring apparatus, outputs would appear at both differential amplifiers, since a change in pitch involves a change in both the X and Y rectangular coordinate information. Such an output is ambiguous, since such pitch-change output could not be distinguished from a simultaneous change in yaw and roll. Since many of the vehicles to which the apparatus of this invention is applicable travel along a trajectory of substantially uniformly changing pitch, such expected change of pitch may be compensated for by mechanical or electronic means in the monitoring system in order to prevent a change in pitch information from being presented to the electronic circuitry herein. For example, the synchronization pick-off head may be mechanically moved to accomplish this result, or a signal may be added or subtracted at an appropriate point in electronic circuitry to effectively cancel any change in pitch; this mechanical or electronic correction may be carried out in a programmed manner, where feasible, or may be made in response to a measured change in pitch while in flight.

Also, it is evident that the vacuum tubes shown in some of the detailed circuitry herein may be replaced by semiconductive elements, and vice versa. Such detailed circuitry and the elements therein may be modified to suit the needs of any given application or installation, and it should be understood that the circuits shown in FIGS. 8–13 are merely exemplary of circuits suitable for the respective purposes of the elements shown in block form in FIG. 7. Hence, the invention is not to be considered as limited to the particular details given, nor to the specific application to which reference has been made during the description of the apparatus, except insofar as may be required by the scope of the appended claims.

What is claimed is:

1. A stellar orientation monitoring system, comprising means for deriving information indicative of the orientation of a reference frame relative to a distant stellar object at first and second given times, means for storing orientation information derived at said first given time, and means to compare such stored information with the orientation information derived at said second given time, whereby a change in the orientation of said reference frame is indicated by a difference between such stored information and the orientation information derived at said second given time.

2. A stellar orientation monitoring system, comprising means for deriving signals indicative of the orientation of a reference frame relative to a distance stellar object at first and second given times, means for storing orientation signals derived at said first given time, and means to compare such stored signals with the orientation signals derived at said second given time, whereby a change in the orientation of said reference frame is indicated by a difference between such stored signals and the orientation signals derived at said second given time.

3. A stellar orientation monitoring system, comprising means for sequentially scanning a stellar field of view, means for correspondingly sequentially recording signals indicative of the positions of stellar objects relative to a reference frame during a first scan of said field of view, means for deriving signals indicative of the positions of such stellar objects relative to said reference frame during a subsequent scan of said field of view, and means for comparing said recorded signals with said derived signals, whereby a change in the orientation of said reference frame is indicated by a difference between such recorded signals and such derived signals.

4. A stellar orientation monitoring system, comprising means for optically focusing a substantially circular stellar field of view at a focal plane, means positioned substantially at such focal plane for masking the passage of light except through a narrow sector of such circular field, means for rotating said field masking means about an axis perpendicular to such focal plane and substantially centrally located in such field of view to sequentially scan such field of view with such unmasked sector, means for chopping light passed through such unmasked scanning sector at a frequency proportional to the radial distance of such light from the center of such field of view, means for sequentially recording signals corresponding both in frequency and time of occurrence to light impulses passed by said unmasked scanning sector and said chopping means during a first scan period of said scanning sector, means for deriving signals corresponding both in frequency and time of occurrence to light impulses passed by said unmasked scanning sector and said chopping means during a subsequent scan period of said scanning sector, means for producing first D.-C. signals in timed relationship with said derived signals and of voltage magnitude corresponding to the frequency of said derived signals, means for producing second D.-C. signals in timed relationship with such sequentially recorded signals and of voltage magnitude corresponding to the frequency of said recorded signals, and means for comparing the magnitudes of said first and second D.-C. signals in timed relationship to indicate by a difference therebetween a change in the stellar light pattern in said field of view between said first and subsequent scan periods of said scanning sector.

5. A stellar orientation monitoring system, comprising means for optically focusing a substantially circular stellar field of view at a focal plane, means for masking the passage of light except through a narrow sector of such circular field including a rotary disk member positioned substantially at such focal plane and having a circular face parallel to such focal plane and opaque except at a narrow sector thereof, means rotating said disk member about an axis perpendicular to such focal plane and substantially centrally located in such field of view to sequentially scan such field of view with such unmasked sector, means for chopping light passed through such unmasked scanning sector at a frequency proportional to the radial distance of such light from the center of such field of view, means for sequentially recording signals corresponding both in frequency and time of occurrence to light impulses passed by said unmasked scanning sector and said chopping means during a first scan period of said scanning sector, means for deriving signals corresponding both in frequency and time of occurrence to light impulses passed by said unmasked scanning sector and said chopping means during a subsequent scan period of said scanning sector, means for producing first D.-C. signals in timed relationship with said derived signals and of voltage magnitude corresponding to the frequency of said derived signals, means for producing second D.-C. signals in timed relationship with such sequentially recorded signals and of voltage magnitude corresponding to the frequency of said recorded signals, and means for comparing the magnitudes of said first and second D.-C. signals in timed relationship to indicate by a difference therebetween a change in the stellar light pattern in said field of view between said first and subsequent scan periods of said scanning sector.

6. A stellar orientation monitoring system, comprising means for optically focusing a substantially circular stellar field of view at a focal plane, means positioned substantially at such focal plane for masking the passage of light except through a narrow sector of such circular field, means for rotating said masking means about an axis perpendicular to such focal plane and substantially centrally located in such field of view to sequentially scan such field of view with such unmasked sector, means for chopping light passed through such unmasked scanning sector including a rotary disk member mounted adjacent said focal plane for rotation about said axis and having a plurality of circular paths of alternately transparent and opaque segments, the number of alternately transparent and opaque segments in the respective circular paths being interrelated in ordered manner to chop light at a frequency proportional to the radial distance of such light from the center of such field of view, means for rotating said light-chopping member about said axis, means for sequentially recording signals corresponding both in frequency and time of occurrence to light impulses passed by said unmasked scanning sector and said chopping means during a first scan period of said scanning sector, means for deriving signals corresponding both in frequency and time of occurrence to light impulses passed by said unmasked scanning sector and said chopping means during a subsequent scan period of said scanning sector, means for producing first D.-C. signals in timed relationship with said derived signals and of voltage magnitude corresponding to the frequency of said derived signals, means for producing second D.-C. signals in timed relationship with such sequentially recorded signals and of voltage magnitude corresponding to the frequency of said recorded signals, and means for comparing the magnitudes of said first and second D.-C. signals in timed relationship to indicate by a difference therebetween a change in the stellar light pattern in said field of view between said first and subsequent scan periods of said scanning sector.

7. A stellar orientation monitoring system, comprising means for optically focusing a substantially circular stellar field of view at a focal plane, means for masking the passage of light except through a narrow sector of such circular field including a rotary disk member positioned substantially at such focal plane and having a circular face parallel to such focal plane and opaque except at a narrow sector thereof, means for rotating said disk member about an axis perpendicular to such focal plane and substantially centrally located in such field of view to sequentially scan such field of view with such unmasked sector, means for chopping light passed through such unmasked scanning sector including a rotary disk member mounted adjacent said focal plane for rotation about said axis and having a plurality of circular paths of alternately transparent and opaque segments, the number of alternately transparent and opaque segments in the respective circular paths being interrelated in ordered manner to chop light at a frequency proportional to the radial distance of such light from the center of such field of view, means for rotating said light-chopping disk member about said axis, means for sequentially recording signals corresponding both in frequency and time of occurrence to light impulses passed by said unmasked scanning sector and said chopping means during a first scan period of said scanning sector, means for deriving signals corresponding both in frequency and time of occurrence to light impulses passed by said unmasked scanning sector and said chopping means during a subsequent scan period of said scanning sector, means for producing first D.-C. signals in timed relationship with said derived signals and of voltage magnitude corresponding to the frequency of said derived signals, means for producing second D.-C. signals in timed relationship with such sequentially recorded signals and of voltage magnitude corresponding to the frequency of said recorded signals, and means for comparing the magnitudes of said first and second D.-C. signals in timed relationship to indicate by a difference therebetween a change in the stellar light pattern in said field of view between said first and subsequent scan periods of said scanning sector.

8. A stellar orientation monitoring system, comprising means for optically focusing a substantially circular stellar field of view at a focal plane, means positioned substantially at such focal plane for masking the passage of light except through a narrow sector of such circular field, means for rotating said masking means about an axis perpendicular to such focal plane and substantially centrally located in such field of view to sequentially scan such field of view with such unmasked sector, means for chopping light passed through such unmasked scanning sector at a frequency proportional to the radial distance of such light from the center of such field of view, transducer means for producing electrical signals corresponding in both frequency and time of occurrence to impulses of light passed by said masking and chopping means, means for sequentially recording such electrical signals during a given scan period of said scanning sector, means for sequentially reproducing such electrical signals in synchronized relationship with a subsequent period of scan of said scanning sector, means for producing first D.-C. signals in timed relationship with said reproduced signals and of voltage magnitude corresponding to the frequency of said reproduced signals, means for producing second D.-C. signals in timed relationship with electrical signals produced by said transducer means during a subsequent period of scan of said scanning sector, said second D.-C. signals being of voltage magnitude corresponding to the frequency of such subsequentially produced signals, and means for comparing the magnitude of said first and second D.-C. signals in timed relationship to indicate by a difference therebetween a change in the stellar light pattern in said field of view between said first and subsequent scan periods of said scanning sector.

9. A stellar orientation monitoring system, comprising means for optically focusing a substantially circular stellar field of view at a focal plane, means positioned substantially at such focal plane for masking the passage of light except through a narrow sector of such circular field, means for rotating said masking means about an axis perpendicular to such focal plane and substantially centrally located in such field of view to sequentially scan such field of view wtih such unmasked sector, means for chopping light passed through such unmasked scanning sector at a frequency proportional to the radial distance of such light from the center of such field of view, means for sequentially recording signals corresponding both in frequency and time of occurrence to light impulses passed by said unmasked scanning sector and said chopping means during a first scan period of said scanning sector, means for deriving signals corresponding both in frequency and time of occurrence to light impulses passed by said unmasked scanning sector and said chopping means during a subsequent scan period of said scanning sector, means for producing first D.-C. signals in timed relationship with said derived signals and of voltage magnitude corresponding to the frequency of said derived signals, means for producing second D.-C. signals in timed relationship with such sequentially recorded signals and of voltage magnitude corresponding to the frequency of said recorded signals, a pair of resolver means each having a pair of information input means for receiving polar coordinate information and a pair of output means for providing corresponding rectangular coordinate information, said first D.-C. signals being applied to an input means of a first of said resolver means, said second D.-C. signals being applied to an input means of the second of said resolver means, and the remaining input means of said resolver means both being energized in synchronism with the rotational movement of said scanning sector, means for comparing the amplitude of the output signal at a first of said output means of a first of said resolver means with the amplitude of the output signal at the output means of the second resolver means which provides information in the rectangular coordinate corresponding to that of said first output means, and means for comparing the amplitude of the output signal at the second of said output means of said first resolver means with the amplitude of the corresponding output signal at the remaining output means of said second resolver means, whereby a difference between the amplitudes of the two inputs applied to each of said comparison means provides an output therefrom indicative of a respective component of a change in said stellar light pattern between said first and subsequent scan periods.

References Cited in the file of this patent
UNITED STATES PATENTS
2,922,224    Gray _____ Jan. 26, 1960